Figure 1:
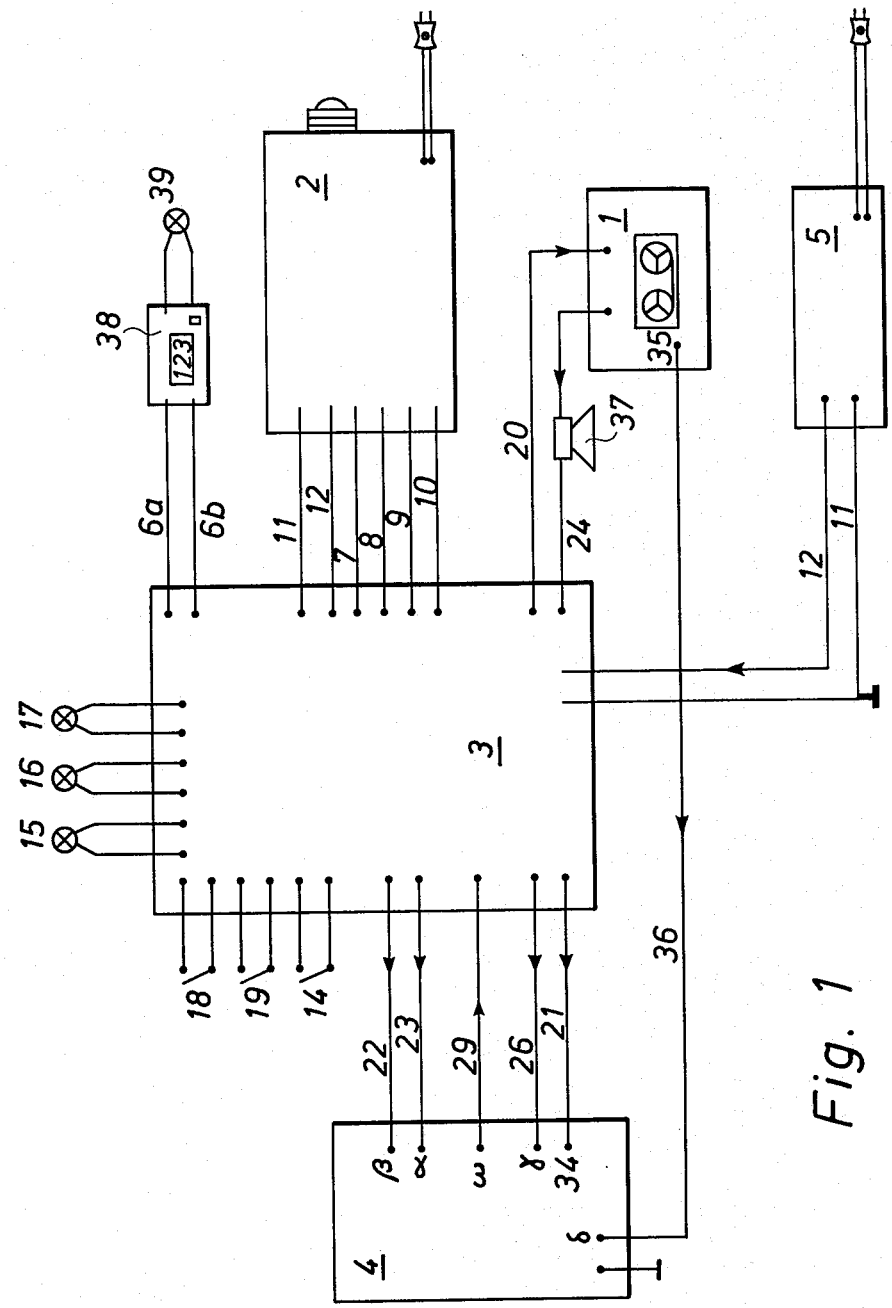

United States Patent [19]
Jensen

[11] 3,896,563
[45] July 29, 1975

[54] AUDIO-VISUAL TEACHING MACHINE

[76] Inventor: Niels Jensen, Lille Vaerlosevej 49, 3500 Vaerlose, Denmark

[22] Filed: Nov. 27, 1973

[21] Appl. No.: 419,301

[30] Foreign Application Priority Data
Nov. 29, 1972 Denmark .............................. 2703/72

[52] U.S. Cl. .................................................... 35/9 A
[51] Int. Cl.² ............................................ G09B 7/02
[58] Field of Search ............. 35/9 R, 9 A, 9 B, 9 D, 35/9 E, 35 C; 179/100.1 VC

[56] References Cited
UNITED STATES PATENTS

| | | | |
|---|---|---|---|
| 2,349,066 | 5/1944 | Witter | 35/9 B X |
| 3,146,534 | 9/1964 | Brown et al. | 35/9 D X |
| 3,628,255 | 12/1971 | Golden | 35/9 E |
| 3,691,313 | 9/1972 | Kobayashi et al. | 179/100.1 VC X |
| 3,755,919 | 9/1973 | Chittick | 35/9 A |

*Primary Examiner*—Wm. H. Grieb
*Attorney, Agent, or Firm*—Ladas, Parry, Von Gehr, Goldsmith & Deschamps

[57] ABSTRACT

An audio-visual teaching machine which utilizes diapositives having certain answer code indication applied on the frame, and a magnetic tape recorder. Logic circuitry controls the tape transport in such a manner that the tape travel is arrested, when an interval occurs in the recorded and reproduced message or lesson, the duration of which interval is greater than the duration of intervals normally occurring in a flow of talk. The tape travel will not continue until the participating student has answered the question given at the end of the lesson.

6 Claims, 5 Drawing Figures

AUDIO-VISUAL TEACHING MACHINE

This invention relates to audio-visual teaching machines comprising a slide projector and a play back device for magnetic tapes, the slides being provided with a code, usable for educational purposes, the machines further comprising an electrical control and sensing circuit including means for evaluation of the answers given by a student and counting means for accumulating the number of correct answers.

Audio-visual teaching machines of the above mentioned type are known in many different forms. E.g. such a machine is known from U.S. Pat. No. 3,584,396. This apparatus comprises means for controlling a magnetic tape recorder, on which tape a series of lesson or message portions is recorded sequentially. The control means permit in an automatic manner a quick selection and sound reproduction of a particular lesson or message portion on the tape in accordance with control signals received from a film strip, which can be travelled in a forward and reverse direction in a viewing device. With each frame or image on the film strip is correlated one particular lesson or message portion and the means described in the above mentioned U.S. patent permit, during viewing a particular image or frame on the film strip, an identification and playing of the lesson or message portion on the magnetic tape, which is correlated with the viewed image or frame. The programming procedure for such a teaching machine is rather troublesome and time-consuming and requires some expertice, because the film strip has to be coded by means of one or another type of identification; e.g. by punching of the film strip itself, whereby identification signals corresponding to the code provided on the film strip are recorded on one track on a stereophonic sound tape. This also results in a complicated elaboration of the electrical control and sensing circuits.

According to the above U.S. patent some time will pass from the moment where a wrong answer is given and to the moment where a correct answer can be presented to the student. This involves an increased mental activity concerning the wrong answer possibly causing a wrong understanding, a process, which may influence on a subsequent learning of a correct answer, so that the correct and the wrong answers may at a later moment be mistaken. After a mutation of some duration in the student's memory, it may thus be difficult to remember the correct answer from the wrong one, given by oneself.

Most teaching methods, which are utilized in connection with audio-visual devices for programmed teaching are based on the principle that the learning is carried out stepwise in such a way that a learning sequence influenced by both his sight and hearing is presented to the student, whereafter an answer to a specific question, is demanded from the student, whereby this answer will be confirmed or corrected before proceeding to the next learning sequence. The advantage of this individual teaching method is that the student himself can decide his own rate. This principle of learning is also followed in connection with the audio-visual teaching apparatus forming the subject of the present invention, which is characterized in that the electrical control and sensing circuit comprises means for arresting the tape travel, when the signal recorded on the tape includes a pause or interval, said means being so adapted that the tape travel is not arrested till the duration of the sensed interval is considerably longer than the duration of intervals normally occuring during a commonly flow of talk, and in that the code provided on the slides is represented by electrical conducting means mounted on the slide frames, which contacting means may be interconnected in an electrically conductive manner.

By thus letting an interval in the recorded information be the "signal" which causes an arresting of the tape travel, the preparation of teaching programs for audio-visual teaching apparatuses is extensively facilitated. The preparation of programs does not require any kind of technical knowledge but can be done by anybody who wants to prepare such a teaching program. The only thing required is a tape recorder, no matter if it is of the mono oral type, together with the photographic equipment which is necessary to the preparation of the slides. Further no particular equipment to provide for instance a "yes" or "no" code on the slide frame itself is needed.

A preferred embodiment of an audio-visual teaching apparatus according to the present invention is characterized in that the electrical control and sensing circuit comprises a control unit built up of relays and a delay unit having a capacitor which through an audio frequency stage of a rectifier is kept charged by means of a rectified audio frequency signal from the tape recorder, and in that the charged condition of said capacitor controls a switch stage and thereby through a relay in the control unit the continued travel of the tape or the arresting of the tape.

As long as sound is reproduced from the tape, the capacitor will be charged by the rectified audio frequency signal, which keeps the switching circuit in an electrically conducting condition for the current supply of a relay in the control unit, which relay maintains the electrical connection between the power supply unit and the tape travel mechanism. By the occurence of short intervals between the signals recorded on the tape the capacitor will, because of its charged condition, keep the switch circuit in a current supplying condition and thus keep the tape travelling due to the fact, that the discharged time of the capacitor has a certain value. If, however, the interval on purpose is extended to have a duration greater that the discharged time of the capacitor, the switch circuit is blocked, causing the relay to relieve, whereby the power supply to the tape travel mechanism is disconnected, and now the student cannot hear and see the subsequent lesson or message portion, until the asked question has been replied to by the actuating of an answering switch.

The possibility of using a tape having especially long feed ends, on which no information can be recorded without causing the tape recorder to stop, is attained by the feature that the delay unit further comprises a second capacitor the discharged time of which is of a longer duration than the discharged time of the first mentioned capacitor, the charge condition of said second capacitor controlling a second switch stage which is connected to and adapted to control the same relay in the control unit as the first switch stage. This is of interest during the initial travel of the tape.

By the feature that the code provided on the slide frames is represented by a thin layer of paste applied on the outer periphery of the slide frames, and which paste may be electrically conductive or electrically non-conductive, dishonest tricks from the student are prevented because he, by inspection of the slide frame, will be unable to determine whether the provided code represents a yes or a no.

Figure 2:
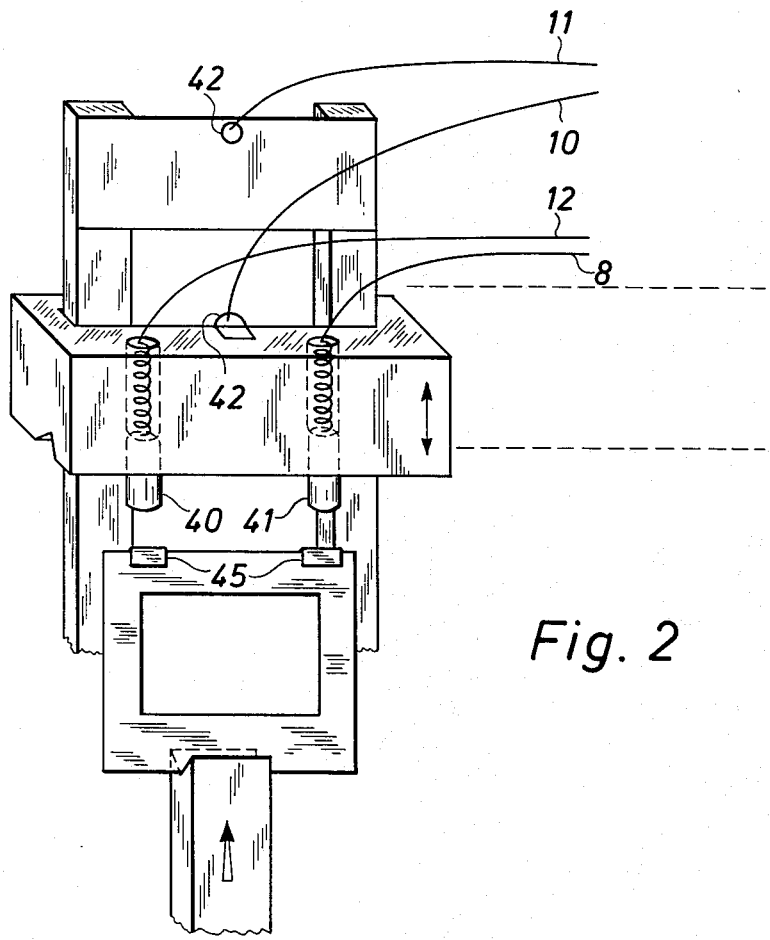
Figure 3:
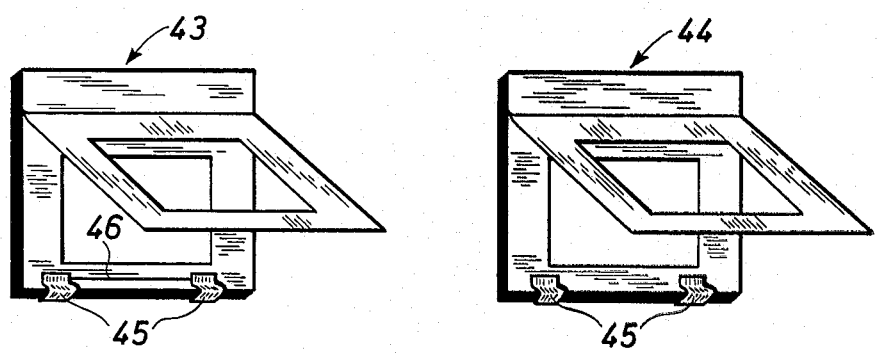
Figure 4:
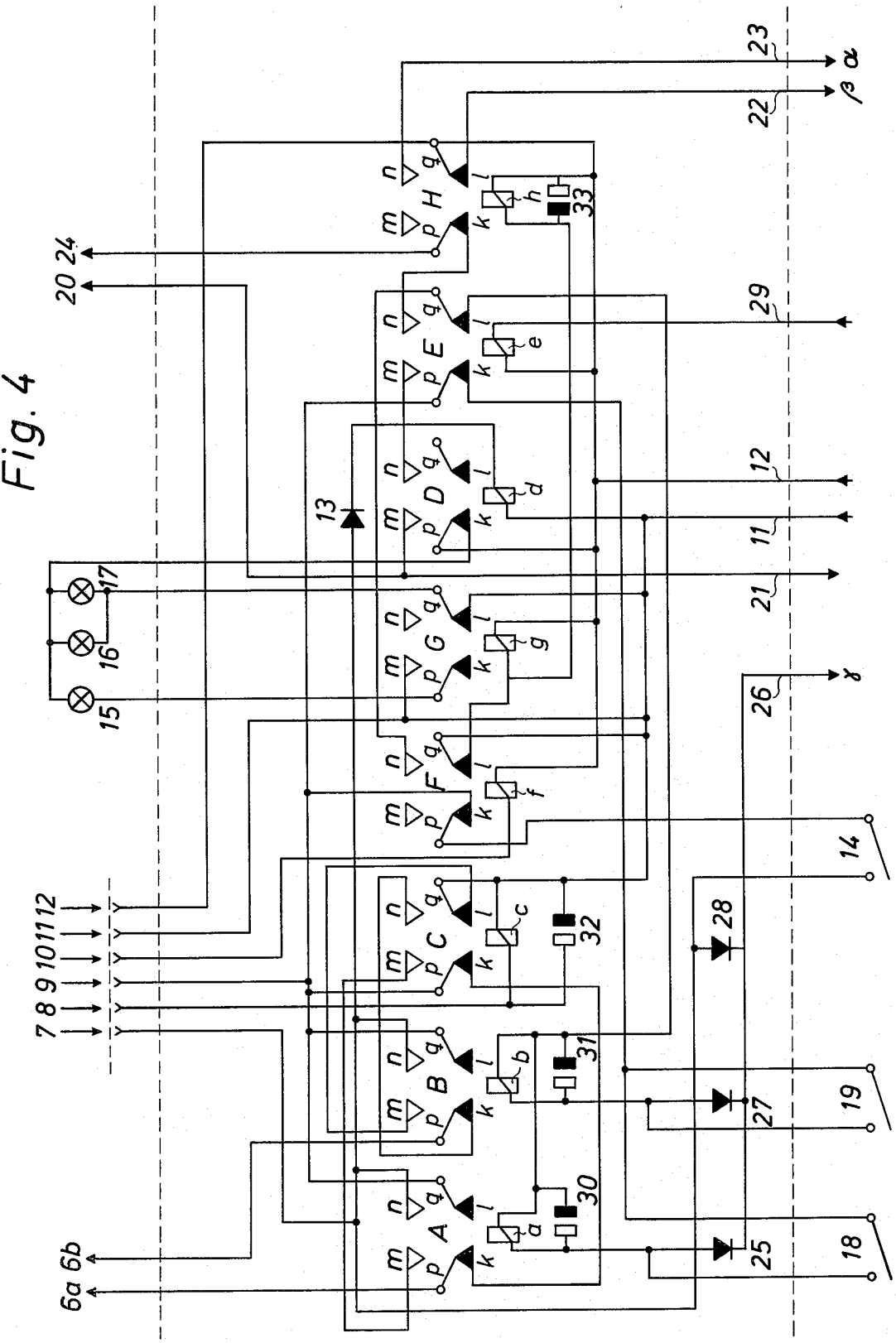
Figure 5:
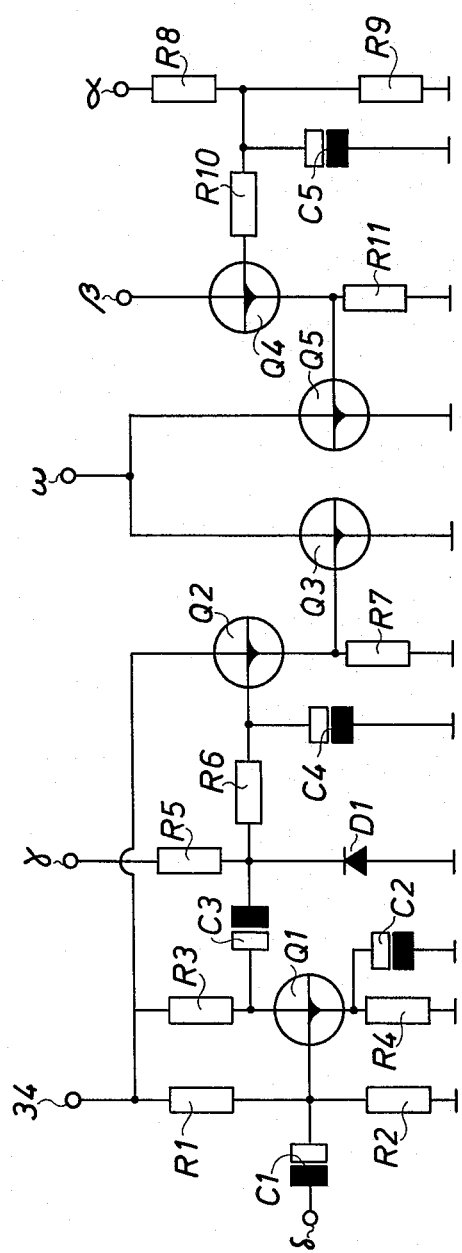
Figure 6:
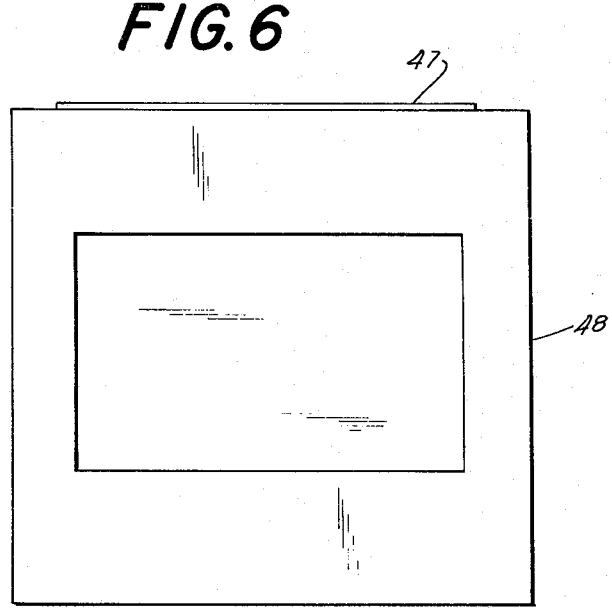
Figure 7A:
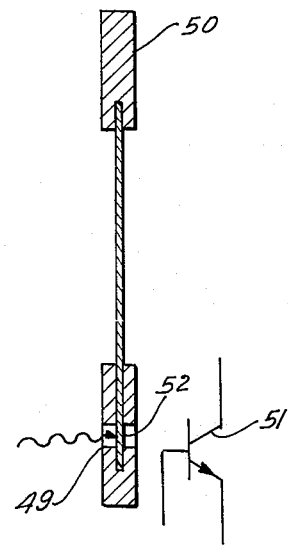
Figure 7B:
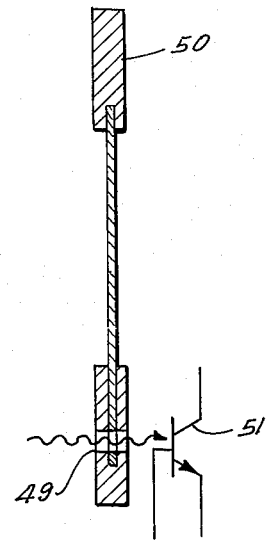

These and other objects and features of the present invention will be apparent from the following detailed description, wherein reference is made to the figures of the accompanying drawings, wherein:

FIG. 1 is a block diagram of the main units forming the teaching apparatus according to the present invention, FIG. 2 shows a detail of a standard type of slide projector, with certain necessary modifications, FIG. 3 shows two slide frames with a first kind of coding means, FIG. 4 shows a detailed diagram of the control unit, FIG. 5 shows a detailed diagram of a delay unit utilized in the teaching apparatus, FIG. 6 shows a slide frame provided with a second kind of coding means, and FIGS. 7a and 7b show two slides with a third kind of coding means.

FIG. 1 shows a block diagram of a teaching apparatus according to the present invention. The apparatus comprises a standard type playing mechanism 1 for sound tapes, especially cassette tapes, and a standard type projector 2 for slides having a built-in frame shift mechanism, which is electrically controlled. In order to render the tape recorder 1 and the projector 2 usable to this particular teaching purpose, they have been modified on a few points, which will be explained in more details in the following. The control of the tape recorder 1 and the projector 2 is accomplished by means of a control unit 3 and a delay unit 4. Finally, these units, except the projector 2, are provided with power via the control unit 3 from a common power supply unit 5, delivering a d.c. voltage of for example 12 V, said power supply unit may be any standard type unit, which can deliver the necessary power. The projector 2 has its own built-in standard type power supply unit of 24 V, which primarily is used to the power supply of the halogen lamp. The power supply unit of the projector, which commonly delivers a d.c. voltage with a magnitude of 24 V, is also utilized in order to deliver the appropriate d.c. voltage levels to the control unit 3 and the delay unit 4.

The tape recorder 1 shown in FIG. 1 is provided with a diode output 35 thus permitting the provision, from the audio frequency states of the tape recorder, of an audio frequency signal, which together with the intervals included in said audio-frequency signal is utilized to control the teaching apparatus. The diode output 35 is connected to a δ-input of the delay unit 4 through a conductor 36. The supply voltage for the tape recorder 1 is delivered by the power supply unit 5 through the control unit 3 and a conductor 20. Finally, the ground terminal of the loud speaker 37 in the tape recorder is connected to the control unit 3 through a conductor 24.

As mentioned above the projector 2 is modified on a few points. In FIG. 2 the system, which slides the diapositives into the projection field is shown. In this sliding system a pair of contact means 40, 41 is provided, which can be placed in contact with corresponding contact means provided on the utilized slide frames as illustrated in FIG. 3. In the same sliding system is provided a switch means 42, which closes, when the diapositive is slid into place and an image appears on the screen. The pair of contacts 40, 41 which senses the pair of contacts 45 on the slide frames is connected to the 12 V supply and to a sensing cord 8, respectively, which is connected to the control unit 3. The switch 42, which is closed when the diapositive is slid into place is connected to ground potential and to a conductor 10, respectively, which leads to the control unit 3. Further a conductor 7 leads from the shifting solenoid in the projector into the control unit and a conductor 9 from the internal 24 V power supply to the control unit. The way in which these conductors 7,8,9 and 10 are connected to the control unit is explained below.

In FIG. 3 are shown two slide frames 43,44, which are shown in an open condition, and a pair of contact means 45 mounted thereon in a spaced relationship and in positions, which correspond to the position of the sensing contact means 40,41, mounted on the sliding system in the projector 2. In the embodiment shown on the left side of the figure the two contact means are interconnected by means of a thin electrically conducting cord 46, which is hidden when the frame parts are tightly locked together. This inlaid metal string 46 represents according to the present invention, the code for the correct answer being a yes. In the embodiment shown to the right, the electrical connection between the contact means 45 is lacking, and this lacking connection between the contact means then represents the code for the correct answer being a no. The contact means 45 may readily be provided by means of thin strips of copper, which are bent around the one-half section of the frame as indicated on the drawing. When the frames are tightly locked up, only small sections of the contacting strips are exposed on the periphery of the frame, and hence it is impossible to recognize whether the code provided in the particular frame represents a yes or a no.

According to the present invention the desired code may also be represented, as shown in FIG. 6, by a thin layer 47 of electrically conducting or electrically non-conducting paste applied onto the edge of the slide frame 48. An electrically conducting paste is used to represent the code for a yes, whereas an electrically non-conducting paste might be utilized for those frames to which a no answer is required. In this case it is impossible to gain knowledge of whether the answer to the question attached to this particular frame should be a yes or no, even by opening the slide frame.

Referring to FIG. 1 an electro mechanical counter 38 and an associated lamp 39 are connected to the control unit through a pair of leads 6a and 6b in such a manner that said counter only counts one step forward concurrently with the energizing of lamp when a correct answer is given. This answer is performed by means of a pair of answer switches, a yes-switch 18 and a no-switch 19 with their associated lamps 16 and 17, respectively. Further a "start" switch 14 with an associated lamp 15 is provided. From the control unit there are lead four conductors to the delay unit 4, namely a conductor 23 to an α-input, a conductor 22 to a β-input, a conductor 26 to a γ-input, and a conductor 29 to a ω-input. The constant supply voltage of 12 V to the delay unit is delivered from the power supply unit 5 via the control unit 3 and a conductor 21.

In the following a detailed description of the control unit 3 and the delay unit 4 is given.

The control unit

Details of the control units of the teaching machine are shown in FIG. 4. It comprises eight double relay switches having a rest position and are on the drawing designated A-H. The fixed contact points of each relay are designated $k, l, m$, and $n$, whereas the movable contact means are designated $p$ and $q$. Finally, the relay coils are designated $a-h$. The two first relays A and B make an answering group. The two subsequent relays C and F make a feed group. Relay G serves as a lamp relay, whereas the relays D and E make a so-called tape group. Finally, the relay H serves as a combined loudspeaker and feed relay for the delay unit 4. The movable contact $p$ of the relay A is through a lead $6a$ connected to the counter 38 and its associated lamp 39 shown in FIG. 1, the return lead $6b$ of which is connected to the movable contact $p$ of the relay B. The second movable contact $q$ of relay A is connected to the movable contact $q$ of the relay B and parallel herewith to the movable contact $p$ of the relay C, to the fixed contact $k$ of the relay F, to the movable contact $p$ of the relay E and finally via a conductor 9 to the internal 24 V voltage supply of the projector 2. The fixed contact $k$ of the relay A is connected to the fixed contact $k$ of relay C. The contact point $A_1$ is unoccupied. The contact point $A_n$ is connected to the fixed contact $m$ of relay C. The contact point $A_n$ is connected in parallel to the contact point $B_n$ and via a diode 13 to the movable contact $q$ of relay D and to the one end of the relay coil $b$. Further the contact point $A_n$ is connected via a lead 7 to a frame shift contact in the projector 2 and to one fixed contact of the start switch 14.

The fixed contact $k$ of relay B is connected to the fixed contact $n$ of relay C, whereas its fixed contact $l$ is unoccupied. The contact point $B_n$ is connected to the contact point 1 of relay C. The movable contact $q$ of relay C is connected in parallel to the one end of the relay coil $c$ and to a common grounding conductor 11, which also is connected to the contact $q$ of relay F, to the contact points $m$ and $l$ of relay G and to the second end of the relay coil $b$.

The fixed contact $l$ of relay F is connected in parallel to the one end of the relay coil $q$ and the one end of the relay coil $h$. The contact point $F_m$ is unoccupied whereas the contact point $F_n$ is connected to the movable contact $q$ of relay E. Finally, the movable contact $p$ of relay F is connected to the movable contact of the start-switch 14.

The contact point $k$ of relay G is unoccupied and the same applies to its contact point $n$. Further the movable contact $p$ of relay G is connected to the start lamp 15, whereas the movable contact $G_q$ is connected to the yes-lamp 16 and the no-lamp 17, respectively, both of which being provided in the answering switches 18 and 19. A common voltage supplying conductor for the start lamp 15 and the answer lamps 16 and 17 is connected to the contact point $k$ of relay D. The contact point $D_1$ is unoccupied. The contact point $D_m$ is connected to a control lead 20 for the tape recorder 1 and a control lead 21 for the delay unit 4. The contact point $D_n$ is connected to the contact point m of relay E. Finally, the movable contact $p$ of relay D is connected to a common voltage supplying lead 12 from the power supply unit 5, said lead also being in connection with the movable contact $q$ of the relay H, with the second end of the relay coil $h$, with the first end of the relay coil $e$, with the movable contact $p$ of relay D, with the second end of the relay coil $q$ and the first end of the relay coil $f$.

The contact point $k$ of relay E is connected in parallel to the movable contact of the yes-switch 18 and with that of the no-switch 19. The contact point $E_1$ is connected in parallel to the first end of the relay coil $a$ and to the first end of the relay coil $b$. The contact point $E_n$ is connected to the fixed contact $k$ of relay H.

The contact point $l$ of relay H is via a lead 22 connected to the $\beta$-input of the delay unit 4. The contact point $H_m$ is unoccupied, whereas the contact point $H_n$ via a lead 23 is connected to the $\alpha$-input of the delay unit 4. Finally the movable contact $p$ of relay H is connected to the grounding conductor 24 of the loudspeaker 37.

The second end of the relay coil $a$ is via a diode 25 and via a lead 26 connected to the $\gamma$-input of the delay unit 4 and directly connected to a fixed contact of the yes-switch 18. The second end of the relay coil $b$ is directly connected to the fixed contact of the no-switch 19, and via a diode 27 to the lead 26 which is lead to the $\gamma$-input of the delay unit. Finally a connection between the fixed contact of the start-switch 14 and the $\gamma$-input of the delay unit is provided via a fourth diode 28.

The second end of the relay coil $c$ is connected to a yes/no sensing conductor 8, which is connected to the sensing contact means 40,41, mounted in the projector, as described above.

The second end of the relay coil 1 is connected to an image control lead 10 and finally the second end of the relay coil via a lead 29 is connected to the $\omega$-output of the delay unit 4. The relay coils $a$, $b$, $c$ and $h$ are finally individually shunted by capacitors 30, 31, 32 and 33, respectively.

The delay unit

The delay unit 4 is shown in details in FIG. 5 and comprises an audio frequency stage and two switch stages. The active component in the audio frequency stage is a transistor $Q_1$, whereas the active components in the first and the second switch stage are the transistors $Q_2$ and $Q_3$ and $Q_4$ and $Q_5$ respectively. The collector of the audio frequency transistor $Q_1$ is via a resistor $R_3$ connected to the positive terminal of the power supply unit 5 via a terminal 34, the lead 21 and the control unit 3. The emitter of the transistor $Q_1$ is connected to ground or ground potential via a resistor $R_4$, which is shunted by a leakage capacitor $C_2$. The base of the transistor is biased by means of a usual voltage dividing network consisting of two resistors $R_1$ and $R_2$, inserted between the terminal 34 and ground potential. The base of $Q_1$ is further via an input capacitor $C_1$ connected to the $\delta$-input of the delay unit. The collector of the first transistor $Q_2$ of the first switch stage is connected directly to the terminal 34, its emitter to ground potential via a resistor $R_7$ and its base to the collector of the audio frequency transistor $Q_1$ via a series connection of a resistor $R_6$ and a transmitting capacitor $C_3$. Its base is further connected to ground potential via a capacitor $C_4$. The junction between the transmitting capacitor $C_3$ and the resistor $R_6$ is connected to ground potential via a diode $D_1$ which is biased in such a manner that its anode is supplied with ground potential and is further connected to the $\gamma$-input of the delay unit via a resistor $R_5$. The second transistor $Q_3$ of the first switch stage has its base connected to the emitter of $Q_2$, its emitter to ground potential and its collector directly to the output terminal $\omega$ of the delay unit.

The collector of the first transistor $Q_4$ in the second switch stage is connected to the $\beta$-input of the unit, its emitter is grounded via a resistor $R_{11}$ and its base to ground potential via a series connection of a resistor $R_{10}$ and a capacitor $C_5$. The junction between the resistor $R_{10}$ and the capacitor $C_5$ is connected via a resistor R to the $\alpha$-input of the unit and via another resistor $R_9$ to ground potential. Finally the emitter of the transistor $Q_4$ is connected to the base of the second transistor $Q_5$ of the said switch stage, the emitter of which is connected directly to ground potential and the collector of which is connected directly to the output terminal $\omega$.

Operation

In the following a detailed explanation of the operation of the teaching apparatus will be given.

In the stand by condition, i.e. when the tape cassette is inserted in the tape recorder, when the slide cassette containing diapositives is pushed forward against the shift pawl or ratchet of the projector, and the projector and the power supply unit are connected to the domestic line voltage and mutually connected by means of a linking cable (including among other things the leads 7, 8, 9 and 10), all the movable contact means $p,q$ of the relays are in their rest positions, i.e. they are abutting on the contact points $k$ and $l$, respectively, apart from the G and H relays which are energized, i.e. their contact means $p,q$ are abutting on the contact points $m$ and $n$, respectively. The relays G and H are energized, because the relay coils g and h are continuously connected to the 12 V voltage supply via the conductor 12 and connected to ground potential via the relay contacts $F_{l-q}$. This means that there is no connection between the ground potential and the loudspeaker 37, as the lead 24 is closed at one end in the relay contact $H_{p-m}$, and that 12 V are applied to the $\alpha$-input of the delay unit via the conductor 12, the relay contact $H_{q-n}$ and the conductor 23. In the delay unit the two switch stages are blocked, because no signal exists on the remaining input terminals. The capacitor $C_5$ is fully charged through the resistor $R_8$.

At the moment, where the start switch 14 is closed, the condition of relays D, E, F, G and H and possibly also C is changed. 24 V from the projector are applied to the relay coil d via the lead 9, the contact $F_{k-p}$, the start switch 14 and the diode 13 in such a manner that relay D is energized. By these means the relay contact $D_{k-p}$ is interrupted and the start lamp 15 is deenergized due to the fact that the voltage applied is removed; the tape recorder 1 is supplied with the working voltage of 12 V through the relay contact $D_{p-m}$ and the conductor 20, thus initiating the tape travel, whereas the audio frequency stage of the delay unit is applied via the conductor 21, a d.c. voltage on the terminal 34, thus providing the working voltage to this stage.

The shift coil of the projector is applied a voltage of 24 V from the projector itself via conductor 9, the relay contact $F_{k-p}$, the start switch 14 and the conductor 7 so that the first diapositive is slid into the projection zone of the projector.

Finally the $\gamma$-input of the delay unit is applied a voltage of 24 V from the projector via the conductor 9, the relay contact $F_{k-p}$, the start switch 14, the diode 28 and the conductor 26. By this measure the capacitor $C_4$ is charged through the resistors $R_5$ and $R_6$. When the capacitor $C_4$ is sufficiently charged the transistor $Q_2$ is saturated and becomes conductive. This establishes a voltage drop across the resistor $R_7$ of sufficient magnitude to bring the transistor $Q_3$ in its saturated condition owing to the fact that it is applied a working voltage of 12 V via the relay coil $e$ and the conductor 29. As soon as the transistor $Q_3$ becomes conductive, the relay E will be energized. By this measure the relay coil $d$ is applied a voltage of 24 V from the projector via a conductor 9, the relay contacts $E_{p-m}$ and $D_{n-q}$, so that the relay D remains energized as long as the relay E is activated.

As soon as the diapositive is slid in place into the projection zone, the contact means 42 mounted in the sliding system is closed, thus enabling a connection between the relay coil $f$ and ground potential via the contact means associated with the conductor 10. By this measure relay F is energized, thus releasing the grounding connection of the relay coil $h$ through the relay contact $F_{l-q}$. By this measure the relay H is deenergized and a grounding connection for the loudspeaker 37 is established through the conductor 24, the relay contacts $H_{k-p}$, $E_{n-q}$ and $F_{n-q}$. The relay G is deenergized too because its associated coil has the same ground connection as the relay coil h, so that the yes- and no-lamps 16, and 17, respectively, are connected to ground potential via the relay contact $G_{q-l}$. Those lamps are, however, unable to shine before the relay D is deenergized. The start lamp 15 is unable to shine before the teaching apparatus again is in its stand by condition, in which relay G again is energized.

At the moment, where relay H is deenergized the $\beta$-input of the delay unit is applied a voltage of 12 V via the relay contact $H_{q-l}$ and the conductor 22, concurrently with the ceasing of the voltage of the $\alpha$-input. Hereby the transistor $Q_4$ becomes saturated, because the base-emitter region is sufficiently biased by the charge of the capacitor $C_5$, whereby said resistor begins to conduct. The voltage drop across the resistor $R_1$ will saturate the transistor $Q_5$ and thus keep the current flowing through the relay coil $e$ and thereby keep the tape travelling until the capacitor $C_5$ is discharged through the resistors $R_9$ and $R_{10}$, respectively, the transistor $Q_4$, the resistor $R_{11}$ and finally the transistor $Q_5$. During the activation of the F-relay the voltage at the $\gamma$-input of the delay unit ceased and consequently the capacitor $C_4$ will discharge through the transistor $Q_2$, the resistor $R_7$ and the transistor $Q_3$.

The values of the capacitor $C_5$ and its associated discharge resistors $R_9$ and $R_{10}$ are calculated in such a manner that the time constant is substantially larger than that of the capacitor $C_4$ and the discharge resistor $R^7$ associated herewith. The discharged time of the capacitor $C_5$ is approximately 12 seconds, and the discharged time of the capacitor $C_4$ is approximately 6 seconds. Hence the second switch stage is designed to keep relay E energized and consequently relay D energized until the leading end of the tape has passed through the sound reproducing head and the reproducing of the recorded learning sections is initiated. The audio frequency signal is transmitted from the diode output 35 via the conductor 36 to the $\delta$-input of the delay unit, where it is amplified by the audio frequency stage and recitified by the diode $D_1$. The recitified current charges the capacitor $C_4$ whereafter the first switch stage again becomes conductive and keeps relay E energized as long as a recorded signal exists on the tape. At the moment, where the audio frequency signal disappears, the capacitor $C_4$ will discharge again, but if an audio frequency signal is reproduced again before the first switch stage is blocked, the E relay is kept energized, and it will now be appreciated that natural intervals in the recorded flow of talk do not cause an arresting of the tape travel. Only if the interval is of a larger duration, approximately 6 seconds and more, the switch stage will block, causing the E relay and consequently the D relay to be deenergized and causing an interruption of the voltage supply to both the tape recorder 1 and the delay unit 4 (the capacitor $C_5$ has discharged long before). When the D relay is deenergized, the power supply of the lamps is established via the contact $D_{p\text{-}k}$, but only the yes and no lamps 16 and 17, respectively, will shine, due to the fact that the G relay is deenergized. Now it is not possible to re-establish the tape travel before either the yes-switch 18 or the no-switch 19 has been closed. The start switch 14 has no influence as the F relay is energized, said energizing being maintained as long as the diapositive is situated in the projection zone of the projector. The apparatus is now ready to receive an answer from the participating student. The condition of relay C depends on the code present in the diapositive which is slid in place. If there exists an electrical connection between the contact means 45 on the slide frame, a conductive connection from the 12 V voltage source will be established within the projector and further through the sensing contacts in the sliding system and the conductor 8 to the relay coil $d$, the second end of which is connected to ground potential, thereby energizing relay C. In the opposite case relay C will remain in its rest position.

Provided that the code incorporated in the slide represents a yes relay C will be energized. This means that the relay contact $A_m$ is applied a voltage of 24V via the conductor 9 and the relay contact $C_{p\text{-}m}$, and that the conductor 6b is applied a ground potential via the relay contacts $C_{q\text{-}n}$ and $B_{p\text{-}k}$. Further, the movable contact means of the yes and the no switches 18 and 19, respectively, will have a potential of 24 V applied thereto from the projector via the conductor 9 and the relay contact $E_{p\text{-}k}$. If the student now closes the yes-switch 18, the relay coil $a$ is applied a voltage of 24 V thus energizing relay A, because the grounding connection of the coil $a$ is in advance established via the relay contacts $E_{l\text{-}q}$ and $F_{n\text{-}q}$. The counter 38 and its associated lamp 39 are applied a voltage via the relay contact $A_{p\text{-}m}$ and the conductor 6a, thus enabling the counter to count one unit forward concurrently with the energizing of the lamp. Hence the answer was correct. If the no-switch 19 had been closed, the relay coil $b$ would have conducted the current in exactly the same way as the relay coil $a$, as the coil $b$ is grounded via the relay contacts $E_{l\text{-}q}$ and $F_{n\text{-}q}$, thus energizing relay B. However, no voltage impulse is transmitted to the counter, as the connection from the conductor 6a via the relay contacts $A_{p\text{-}k}$ and $C_{k\text{-}p}$ to the 24 V bearing conductor 9 is interrupted because of the energized condition of relay C and further because the connection from the conductor 6b via the relay contacts $B_{p\text{-}m}$ and $C_{l\text{-}q}$ to the common ground potential conductor 11 is interrupted in order to energize relay C.

Provided that the code on the slide frame represents a no the relay coil $c$ will carry no current causing the relay C to remain in its rest position. The contact point $A_k$ is herewith applied a positive voltage via the relay contact $C_{k\text{-}p}$, which applies a positive potential on the conductor 6a, and a ground potential on the contact point $B_m$ via the relay contact $C_{l\text{-}q}$. By closing the yes-switch, relay A is energized, which interrupts the voltage supply to the conductor 6a and thus prevents the counter from counting. Hence the answer is wrong. On the contrary, if the no-switch 19 is closed a grounding connection to the counter 38 and its lamp 39 is established via the conductor 6b, the relay contacts $B_{p\text{-}m}$ and $C_{l\text{-}q}$ thus actuating the counter and the lamp. By this measure the student gets a visual confirmation saying that his answer is correct. It will now be appreciated that a wrong answer in accordance with the present invention is corrected at the same instant as it is given. Hence there exists no possibility or no reasons for further mental processing of this wrong answer. As the answer is one of two alternatives, the second alternative will always have been considered by the student, and if the wrong alternative is chosen, the correct alternative will be learned immediately after. On this important educational point the present invention distinguishes remarkably from all other known audio-visual aids and from programmed teaching systems of the prior art.

A simultaneous closing of both the yes and the no switches will not permit an activation of the counter and its lamp, because when relay C is in its rest position, the voltage on the conductor 6a ceases by energizing relay A (no-code in the slide frame), and because the ground connection to the conductor 6b is interrupted by energizing relay B, when relay C is energized (yes-code in the slide frame). By this simple measure dishonest tricks regarding the accumulation of scores is anticipated.

As soon as either the yes or the no switch is closed the $\gamma$-input of the delay unit is applied a 24 V level, simultaneously with current flowing through the relay coil $d$ via the relay contact $A_{q\text{-}n}$ and the diode 13 or the relay contact $B_{q\text{-}n}$ and the diode 13. By this measure relay D changes over, and the tape recorder and the delay unit are actuated as described above. Simultaneously, the shift coil of the projector is supplied with power via the above mentioned relay contacts and the conductor 7. As soon as the first image is slid away from the projection zone, relay F is deenergized and relay G is energized simultaneously with relay H. However, relay F will re-energize as soon as the succeeding diapositive is slid into place in the projection zone, whereby relays G and H are deenergized again and the entire procedure is repeated as described above until a new interval of a duration longer than 6 seconds again is reproduced, thus permitting the student to reply to the new question asked.

Thus it appears from the foregoing description that the control signal to control the teaching sequence is formed by a developed interval in the signal recorded on the tape, an interval of a longer duration than intervals normally occuring in a flow of talk. This facility renders the recording of controlled impulse signals on one of the tracks of the tape superfluous. Thus there is no need for auxiliary equipment to record such control impulse signals, and mono oral sound reproducing devices will do. This feature also opens up the possibility of particular utilization of the described apparatus as a control unit for synchronization of diapositives with mono oral tape transport mechanisms.

Further, the electrical control circuit may be limited to comprise a relay unit including eight relays and a delay unit including a simple audio frequency amplifier and two electronic switch stages. Further, the necessary modifications, which have to be carried out on standard type apparatuses as the projector and the tape recorder, are of small extent. The manufacturing cost of the teaching machine described above is therefore substantially small compared to the cost of the teaching machines hitherto marketed. Further, no assistance of an expert is required in order to prepare teaching programs for a teaching apparatus of the present invention.

The control unit described above is by way of example built-up of eight relays, but there is nothing to prevent, within the scope of the present invention, the relay functions from being provided by means of transistors, possibly utilizing the integrated circuit technique too. Within the scope of the present invention it is also possible to provide the coding on the slide frames without direct electrical contacting means. The coding may be provided as shown in FIGS. 7a and 7b by means of a bore 49 through the slide frame 50 through which bore a light beam from the projector lamp is directed towards a photo transistor 51. In the case the answer should be a no, the bore is occluded as shown in FIG. 7a by a portion 52 of the film strip thus preventing the light beam from energizing the photo transistor, whereas when the answer should be a yes the bore is not occluded, as shown in FIG. 7b, and the light beam energizes the photo-transistor. Light beam or no light beam to energize the photo transistor has just the same effect as the presence or absence of the conducting string 46 disclosed in FIG. 3. This modification for such a light sensing transistor is usable in any projector, because an accommodation for such a light sensing transistor is always present.

Accordingly it should be clearly understood that the thought of the invention described above and shown in figures of the accompanying drawings is only illustrative and is not intended to limit the scope of the present invention.

What I claim is:

1. An audio-visual teaching apparatus comprising a slide projector and a play-back device for a magnetic tape having recorded thereon instructions, questions, and silent periods, said play-back device having means for arresting the tape travel when a silent period has persisted for a predetermined duration considerably longer than the duration of intervals occurring during normal speech, said slide projector including a slide shifting mechanism for successively bringing a number of slides into a viewing position in said projector, each slide having a frame provided with code means to represent which of two possible answers to a given question, recorded on said magnetic tape, is correct, and the apparatus further comprising a sensing means to cooperate with the code means and determine which of the two possible answers to said question is correct, a response means to be actuated by a student to provide his answer to the question, and a control means operative only when the tape is stationary to compare the answer provided by the student with the correct answer as determined by the sensing means, provide an indication of whether or not the answer provided by the student is the same as the correct answer as determined by the sensing means, and start the tape travel one more.

2. The apparatus of claim 1 in which the control means comprises a control unit built-up of relays and a delay unit having a first capacitor means which, via an audio frequency stage and a rectifier means, is kept charged by means of the recorded and played instructions and questions, and in which the charged condition of said first capacitor means controls a first switch stage and thereby via a relay in the control unit the continued travel of the tape or the arresting of the tape.

3. The apparatus of claim 2 wherein said delay unit further comprises a second capacitor means the discharge time of which is of a longer duration than the discharge time of said first capacitor means, the charged condition of said second capacitor means controlling a second switch stage which is connected to and controls the same relay in the control unit as said first switch stage.

4. The apparatus of claim 1, wherein the code means provided on each frame consists of two electrically conductive portions which are either electrically connected to each other to represent that a first of said two possible answers is correct or are electrically insulated from each other to represent that the second of said two possible answers is correct.

5. The apparatus of claim 1, wherein the code means provided on each frame consists of a thin layer of paste applied on the outer periphery of the slide frame and which paste is electrically conductive to represent that a first of said two possible answers is correct or is electrically non-conductive to represent that the second of said two possible answers is correct.

6. The apparatus of claim 1, wherein the code means provided on each frame consists of a narrow bore in the frame itself, which bore penetrates the film material of said slide to represent that a first of said two possible answers is correct or is occluded by said film material to represent that the second of said two possible answers is correct, said sensing means comprising a photo-transistor for sensing a light beam through said bore in the frame.

* * * * *